July 1, 1952     V. J. SCALISE     2,601,965
ADJUSTABLE INDICATOR HOLDER
Filed Feb. 27, 1948
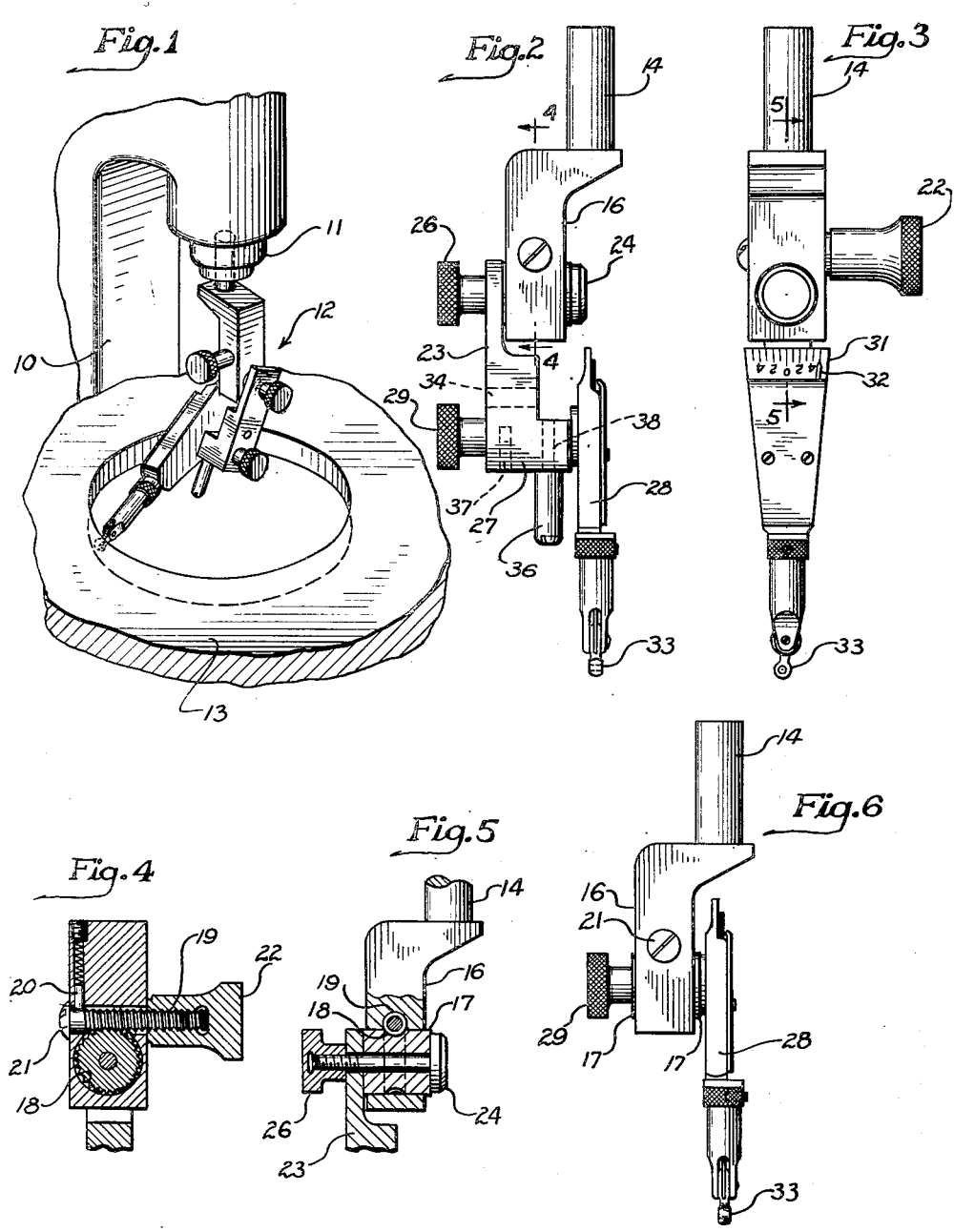
INVENTOR.
Vincent J. Scalise Patented July 1, 1952

2,601,965

UNITED STATES PATENT OFFICE 2,601,965

ADJUSTABLE INDICATOR HOLDER

Vincent J. Scalise, Chicago, Ill.

Application February 27, 1948, Serial No. 11,406

7 Claims. (Cl. 248—124)

My invention relates to an adjustable indicator holder of a type having its greatest utility in locating the exact center of round holes in work pieces.

In many operations involving the use of tools, as, for example, in producing production tools and dies, it is necessary to measure the distance from center to center of holes with extreme accuracy. For this type of work, it is customary to use a conventional type of indicator which is mounted at an angle to a spindle and usually moved by hand until the indicator shows that the axis of the spindle coincides exactly with the center of the hole. Various types of holding jigs and the like have been utilized for this purpose but none is fully satisfactory. Among the disadvantages of jigs and holders heretofore used is the fact that usually the angle of the indicator must be changed by hand so that moving the same a precise distance is difficult and repeated movements are sometimes necessary before a center is finally established. Still another disadvantage comes from the fact that jigs or holders which are suitable for determining the centers of small holes can be adjusted only with difficulty for locating the centers of large holes and vice versa.

The principal object of my invention is the provision of an improved adjustable indicator holder.

Another object is the provision of an adjustable indicator holder which is extremely versatile from a utility standpoint in its ability to be used in many ways and with many types of indicators.

In the drawings, I show a preferred embodiment of my invention and indicate the manner in which the holder is used.

In the drawings:

Fig. 1 is a perspective view partly broken away, showing the adjustable indicator holder of my invention mounted in the tool holding chuck of a drill spindle;

Fig. 2 is a side elevational view showing the holder removed from the spindle;

Fig. 3 is an elevational view looking at the right hand side of Fig. 2;

Fig. 4 is a fragmentary sectional view taken on the line 4—4 of Fig. 2;

Fig. 5 is a fragmentary sectional view on the line 5—5 of Fig. 3; and

Fig. 6 is an elevational view showing another manner of use of the indicator holder.

Referring now to the drawing, I show in Fig. 1 a machine tool 10 having a spindle 11 to which the adjustable indicator holder identified generally by the reference character 12 is attached for determining the center of a relatively large bored hole in a work member 13.

The adjustable indicator holder 12 comprises a stem 14 and an offset body portion 16 in which a bearing plug 17 is journalled. The center of the plug 17 is cut to form worm teeth 18. A worm 19 extending through the body portion 16 with its axis at right angles to the axis of the bearing plug 17 engages the teeth 18 as a worm wheel so that rotation of the worm 19 will cause rotation of the bearing plug 17 at a reduced rate of speed. Suitable means, such as a spring pressed pin 20, is employed to assure functional engagement of the worm 19 against the teeth 18. The worm 19 suitably may comprise a screw thread and has a head 21 with its unheaded end threaded in a blind nut 22 which forms a knob by means of which the worm is rotated. I have found that if the worm 19 is drawn up very tightly with respect to the blind nut 22, so that its end engages the inner surface thereof, the parts will stay in assembled relation without loosening. Those skilled in the art will understand that other means of forming and mounting a worm in this position may be used.

The bearing plug 17 projects from the body portion 16 slightly at each end as shown particularly in Figs. 2 and 5. An indicator holding arm 23 is secured to the bearing plug 17 by means of a specially designed bolt 24 and nut 26. Thus, if the worm 19 is turned, the angularity of the arm 23 is changed by the resulting rotation of the bearing plug 17.

The arm 23 has an enlarged underslung portion 27 so that, looking at Fig. 2, this arm is generally L-shaped. A dial type indicator 28 is secured to the arm 23 by the usual attaching means furnished with such devices, usually an integral threaded pin (not shown) to the projecting end of which (not shown) a thumb nut 29 is secured. The indicator shown in the drawing is a type having a dial 31 traversed by needle 32, the position of which is controlled by engagement against the edge of a movable feeler 33. The indicator 28 is so supported that the position of the feeler 33 thereof may substantially exactly coincide with the axis of the stem 14, and so that if the indicator is swung to one side or the other, the movement will substantially be along a radius line of a circle defined by the end of the fingers when the tool is rotated about the axis of the stem 14.

In addition to the hole through the arm 23 used for fastening the indicator, shown in the drawing, I provide an additional transverse hole 34 and also a threaded pin 36 and two additional generally vertical holes 37 and 38. I have found that using the special shape of arm 23 shown, it is possible for me to mount to such arm substantially all of the dial indicator tools now available on the market. Some of these indicators are calibrated in thousandths of an inch and some in ten-thousandths of an inch, and they have been provided with various types of mountings. While the main advantages of my invention may be utilized in a tool, the adjustable indicating holder arm of which will support only a single type of indicator, I prefer an arrangement such as shown in the drawing in which all or most of the indicators now available on the market can be employed. This feature not only has an advantage from the cost standpoint in that only a single device need be manufactured, but it also has a further utility in that a mechanic who customarily uses more than one indicator, will have to use only one type of adjustable holder regardless of the number of indicators which he may employ.

In Fig. 6, I show the indicator 28 attached directly to the bearing plug 17, but at the opposite side thereof to the usual point of attachment of the arm 23. As indicated, this places the indicator in vertical alignment with the stem 14.

The manner of employing the adjustable holder of my invention is, for the most part, made clear from the positioning thereof in Fig. 1. It will be noted that the use of the arm 23 not only provides added adjustment for extending the indicator to the circumference of large bored holes, but it also facilitates introducing the indicator to the bottom of deep bored holes. When the position of the indicator is approximately adjusted, the final adjustment is made by turning the knob 22 as a result of which there is a positive controlled movement of the indicator in the direction in which it is desired to move it. It will be noted that for rapid approximate positioning of the indicator, the thumb nut 29 can first be loosened and the arm 23 moved with respect to the plug 17 and then tightened. The same rapid relative positioning of the indicator itself can be made when it is set up in the manner shown in Fig. 2 and also when it is set up in the manner shown in Fig. 6. It will be noted also that because of the construction of the worm and worm wheel, and the bearing plug 17 on which the worm wheel is formed, there is no end position of the tool and it is, therefore, unnecessary to return it to an original position before it can again be used to advantage. The worm, in other words, could be turned always in the same direction, so far as its construction is concerned, and the tool could be operated in this manner.

What I claim as new and desire to protect by Letters Patent of the United States is:

1. An adjustable indicator holder comprising a stem adapted to be engaged in a spindle socket or the like, a body portion carried on said stem below and laterally offset therefrom, a bearing plug extending through said body portion and having at least its central portion formed to comprise a worm wheel, a worm journalled in the said body portion and engaging said worm wheel, an arm secured to said bearing plug, and means associated with said arm for securing an indicator thereto substantially in alignment with the axis of said stem.

2. An adjustable indicator holder comprising a stem adapted to be engaged in a spindle socket or the like, a body portion carried on said stem below and laterally offset therefrom, a bearing plug extending through said body portion and having at least its central portion formed to comprise a worm wheel, a worm journalled in the said body portion and engaging said worm wheel, an arm secured to said bearing plug, and means associated with said arm for securing an indicator thereto, said arm being pivoted to that part of the body portion furthest removed from the stem, and being L-shaped, the L extending below the body portion, said indicator being thereby below and substantially in alignment with the axis of the said stem.

3. An adjustable indicator holder comprising a stem adapted to be engaged in a spindle socket or the like, a body portion carried on said stem below and laterally offset therefrom, a bearing plug extending through said body portion and having at least its central portion formed to comprise a worm wheel, a worm journalled in the said body portion and engaging said worm wheel, an arm releasably secured to said bearing plug, and means associated with said arm for securing an indicator thereto in alignment with said stem, said arm being removable to permit securing an indicator directly to the said plug in alignment with said stem.

4. An adjustable indicator holder comprising a stem adapted to be engaged in a spindle socket or the like, a body portion carried on said stem below and laterally offset therefrom, an arm pivoted to said body portion, means for securing an indicator to said arm in alignment with said stem, and screw means for mechanically adjusting the position of the arm with respect to the body portion.

5. An adjustable indicator holder comprising a stem adapted for support in a spindle socket or the like, a body portion fixed to the stem, and projecting downwardly from the stem but laterally offset therefrom, a bearing plug extending through the body portion and journalled therein, one projecting end of the said bearing plug lying immediately below the stem substantially aligned with the axis thereof, and an L-shaped arm secured to that end of the bearing plug furtherest removed from alignment with the axis of the stem, the said arm having an indicator supporting portion projecting over into substantial alignment with the said stem.

6. An adjustable indicator holder comprising a stem adapted for support in a spindle socket or the like, a body portion fixed to the stem, and projecting downwardly from the stem but laterally offset therefrom, a bearing plug extending through the body portion and journalled therein, one projecting end of the said bearing plug lying immediately below the stem substantially aligned with the axis thereof, and an L-shaped arm secured to that end of the bearing plug furtherest removed from alignment with the axis of the stem, the said arm having an indicator supporting portion projecting over into substantial alignment with said stem, said bearing plug having means permitting direct attachment of an indicator to that end thereof immediately below the said stem.

7. An adjustable indicator holder comprising a stem adapted for support in a spindle socket or the like, a body portion fixed to the stem, and projecting downwardly from the stem but laterally offset therefrom, a bearing plug extending through the body portion and journalled therein, one projecting end of the said bearing plug lying immediately below the stem substantially aligned with the axis thereof, an L-shaped arm secured to that end of the bearing plug furtherest removed from alignment with the axis of the stem, the said arm having an indicator supporting portion projecting over into substantial alignment with the said stem, a worm gear formed on a center portion of the said bearing plug, and a worm journalled in the body portion and engaging said worm gear, for adjustment of the position of the said plug, and indicator carried by the arm.

VINCENT J. SCALISE.

REFERENCES CITED

The following references are of record in the file of this patent:

UNITED STATES PATENTS

| Number | Name | Date |
|---|---|---|
| 519,703 | Ekman | May 15, 1894 |
| 649,011 | Szafka | May 8, 1900 |
| 2,355,630 | Sass | Sept. 9, 1941 |
| 2,447,624 | Akert | Aug. 24, 1948 |

OTHER REFERENCES

American Machinist (p. 857), November 24, 1921.